Dec. 8, 1936.  M. JOHNSON  2,063,440
AUTOMOBILE BRAKE
Original Filed April 15, 1935  2 Sheets-Sheet 2
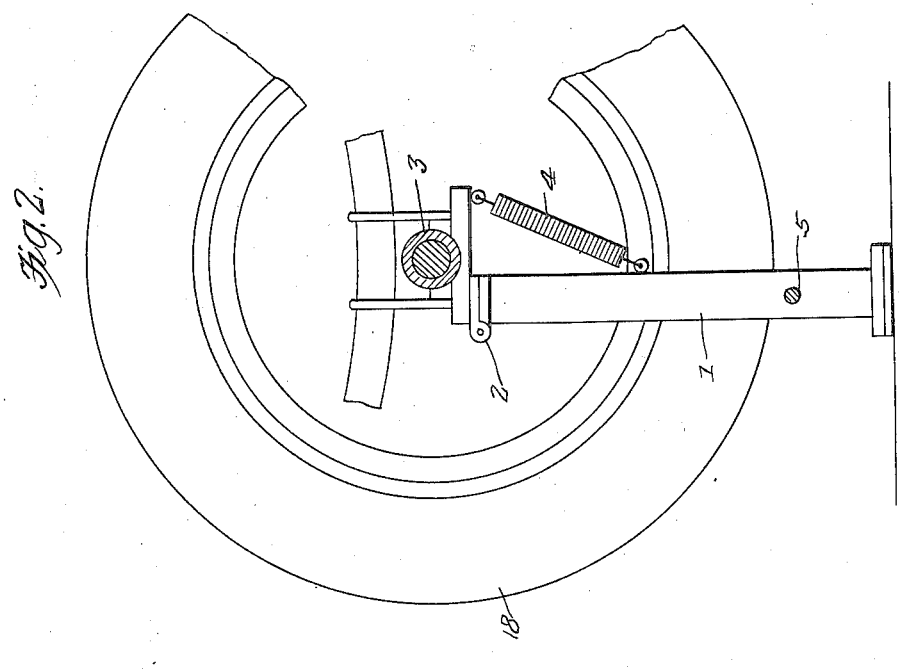
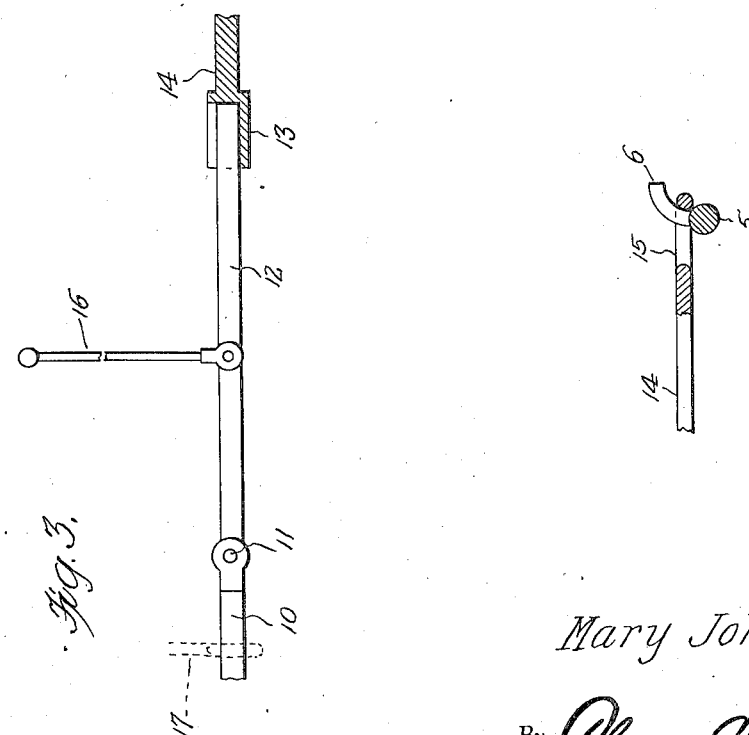
Inventor
Mary Johnson,
By Clarence A. O'Brien
Attorney Patented Dec. 8, 1936

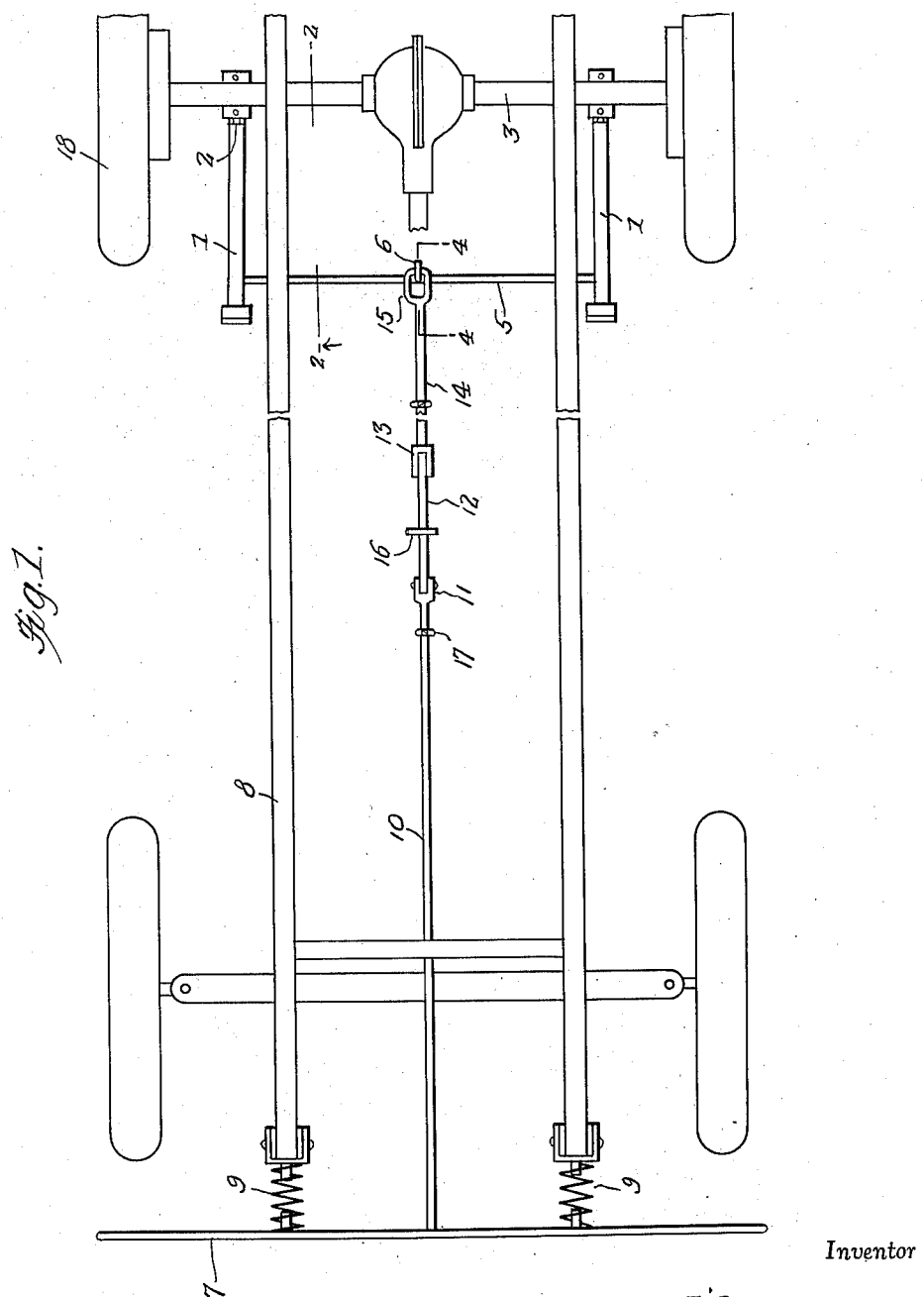

2,063,440

UNITED STATES PATENT OFFICE 2,063,440

AUTOMOBILE BRAKE

Mary Johnson, Cleveland, Ohio

Application April 15, 1935, Serial No. 16,457
Renewed July 1, 1936

2 Claims. (Cl. 180—83)

The present invention relates to new and useful improvements in automobile brakes and has for its primary object to provide, in a manner as hereinafter set forth, a novel construction, combination and arrangement of parts through the medium of which the vehicle will be automatically and quickly brought to a stop should it collide with a pedestrian or object.

Another important object of the invention is to provide, in a brake of the aforementioned character, means through the medium of which the operator of the automobile may render the apparatus inoperative when desired, as when parking or driving in heavy traffic when collisions of no consequence may occur.

Other objects of the invention are to provide an automatic automobile brake of the aforementioned character which will be comparatively simple in construction, strong, durable, highly efficient and reliable in operation, compact, and which may be manufactured and installed at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a top plan view, showing the invention installed on the running gear of an automobile.

Figure 2 is a sectional view taken substantially on the line 2—2 of Figure 1, showing one of the ground engaging members in operative or lowered position.

Figure 3 is a view principally in side elevation, showing the means for rendering the apparatus inoperative.

Figure 4 is a view principally in longitudinal section, taken substantially on the line 4—4 of Figure 1.

Referring now to the drawings in detail, it will be seen that the embodiment of the invention which has been illustrated comprises a pair of ground engaging brake members 1 which are mounted on hinges 2 beneath the rear axle 3 of the automobile, as illustrated to advantage in Figure 2 of the drawings. Springs 4 accelerate the downward swinging movement of the brake members 1 to operative position. It will be noted that the hinge structure 2 is such that the brake members 1 cannot swing beyond a substantially vertical position. Extending between the brake members 1 is a rod 5 which is provided, at an intermediate point, with an upwardly and rearwardly curved hook 6, the purpose of which will be presently set forth.

The reference numeral 7 designates a bumper which is preferably mounted on the forward end of the automobile frame 8 through the medium of coil springs 9. Connected to the bumper 7 and extending rearwardly therefrom is a rod 10 having hingedly mounted on its rear end, as at 11, (see Figure 3) a bar 12. The free end portion of the bar 12 is engageable in the enlarged, substantially channel-shaped forward end portion 13 of a rod 14, said rod 14 having an eye 15 on its rear end for the reception of the hook 6. An operating rod 16 is pivotally connected to the bar 12 and extends through the floor of the automobile at a point convenient to the operator. The rods 10 and 14 may be slidably mounted in suitable hangers 17 which depend from the body of the automobile.

It is thought that the operation of the invention will be apparent from a consideration of the foregoing. With the hook 6 engaged in the eye 15 the brake members 1 are supported in raised or inoperative position against the tension of the springs 4. Should a collision with a pedestrian or object occur, the bumper 7 is forced rearwardly by the impact against the tension of the springs 9, thus shifting the eye 15 rearwardly in a manner to permit disengagement of the hook 6 therefrom. The brake members 1 then drop to operative position by gravity and under impulsion by the springs 4. When the brake members 1 engage the ground the rear wheels 18 are elevated out of engagement with said ground by reason of the momentum of the vehicle, said brake members 1, of course, being of sufficient length to elevate the wheels in this manner. It will thus be seen that the automobile will be brought with certainty to a quick stop. Should it be desired to render the apparatus inoperative, as when parking or under other conditions, the operator simply swings the bar 12 upwardly out of engagement with the socket 13 through the medium of the rod 16, thus disconnecting the rod 10 from the rod 14.

It is believed that the many advantages of an automobile brake constructed in accordance with the present invention will be readily understood, and although a preferred embodiment of the invention is as illustrated and described, it is to be understood that changes in the details of construction and in the combination and arrangement of parts may be resorted to which will fall within the scope of the invention as claimed.

What is claimed is:—

1. A vehicle brake comprising ground engaging brake members hingedly mounted beneath the vehicle, resilient means normally urging said brake members into operative position, a bumper yieldingly mounted on the vehicle, rods slidably mounted beneath the vehicle, one of said rods being connected to the bumper for actuation thereby, a socket on the other of said rods, a bar pivotally mounted on said one rod and engageable in the socket for releasably connecting said other rod to said one rod for actuation thereby, and means releasably connecting the brake members to said other rod for securing said brake members in inoperative position and upon movement of the bumper through impact to permit said brake members to move to operative braking position.

2. A vehicle brake comprising a pair of ground engaging brake members hingedly mounted beneath the vehicle, resilient means yieldingly urging the brake members toward operative position, a rod extending between said brake members, a hook on said rod, a bumper yieldingly mounted on the vehicle, rods slidably mounted beneath the vehicle, one of the second-named rods being connected to the bumper for actuation thereby, an eye on the other of the second named rods engageable with the hook for releasably securing the brake members in inoperative position and upon movement of the bumper through impact to permit said brake members to move to operative braking position, and means releasably connecting said other rod to said one rod whereby said brake members may be controlled independently of the movement of the bumper.

MARY JOHNSON.